UNITED STATES PATENT OFFICE.

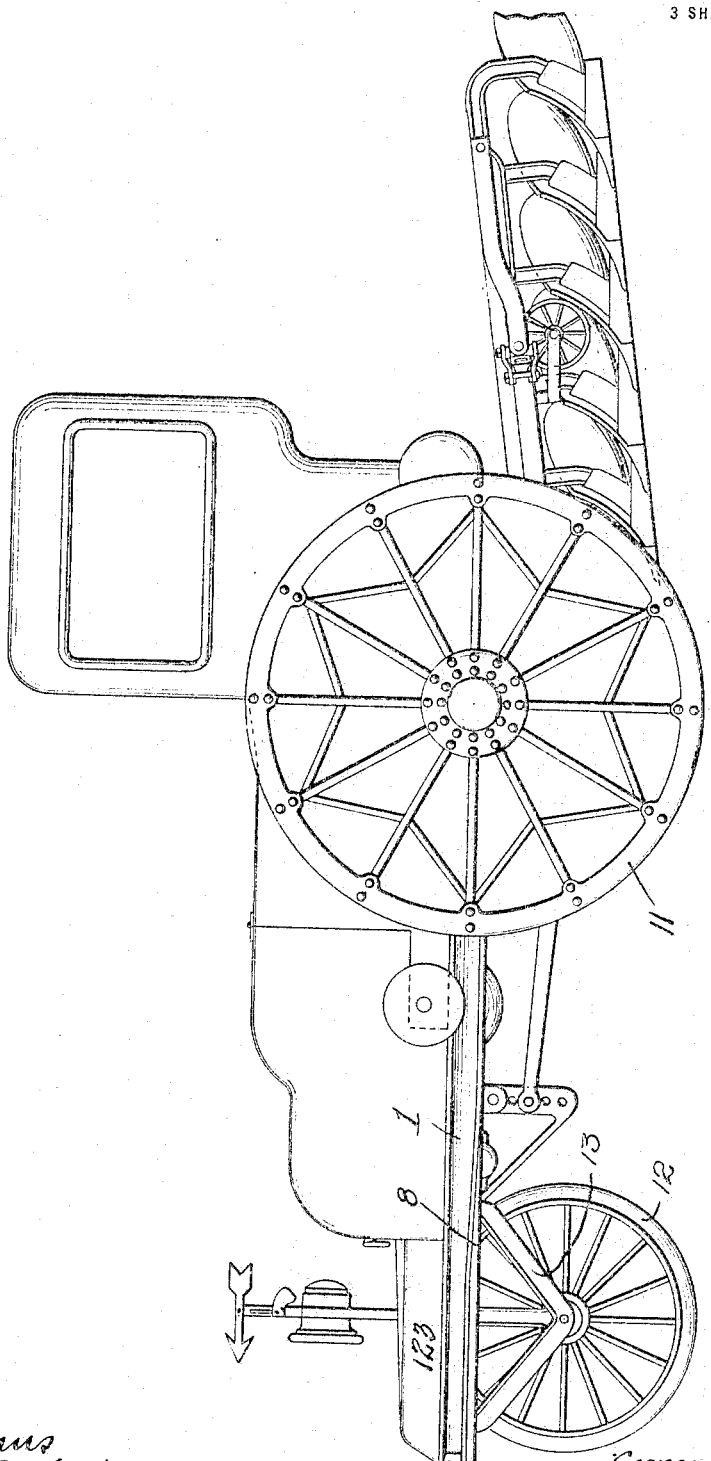

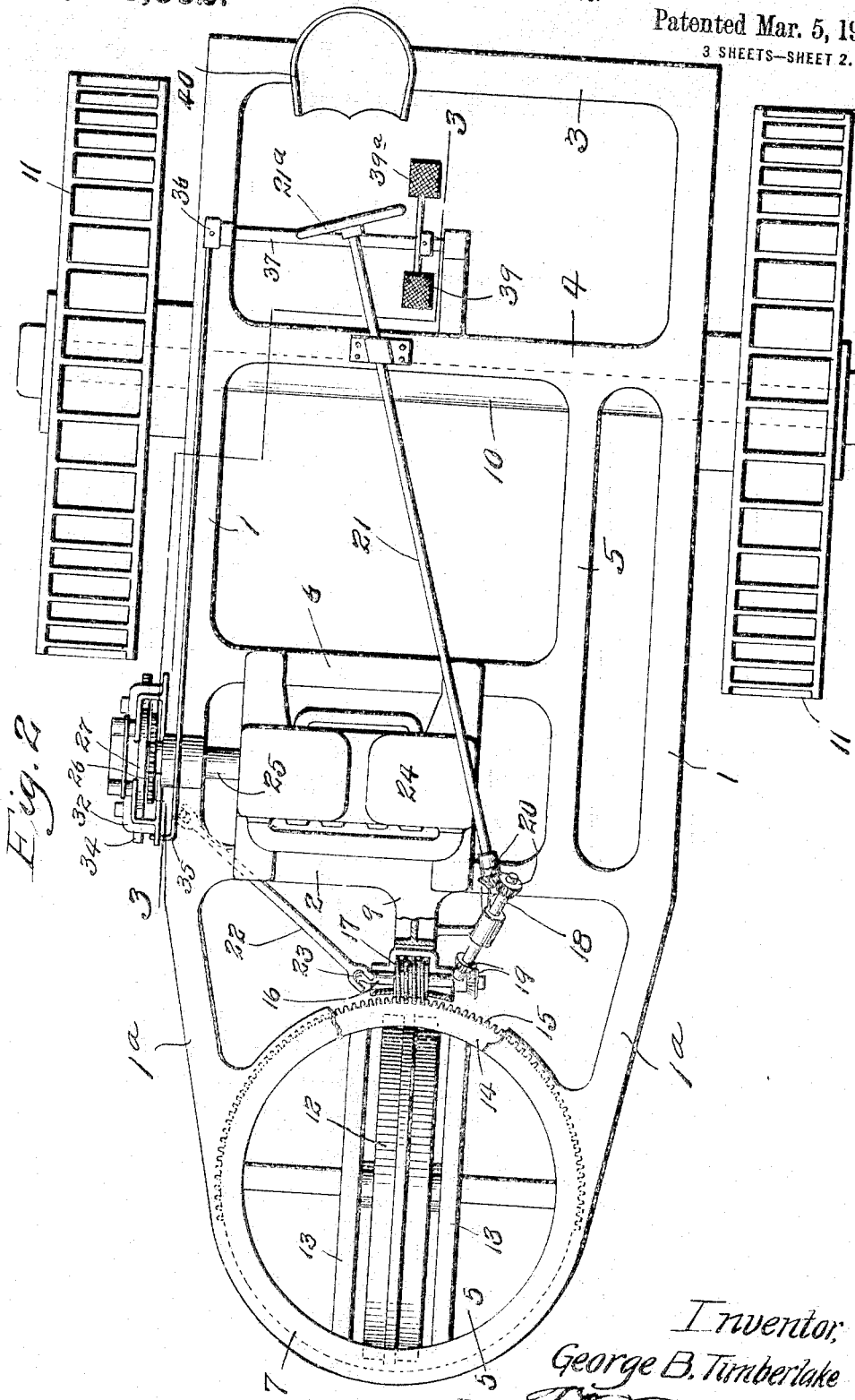

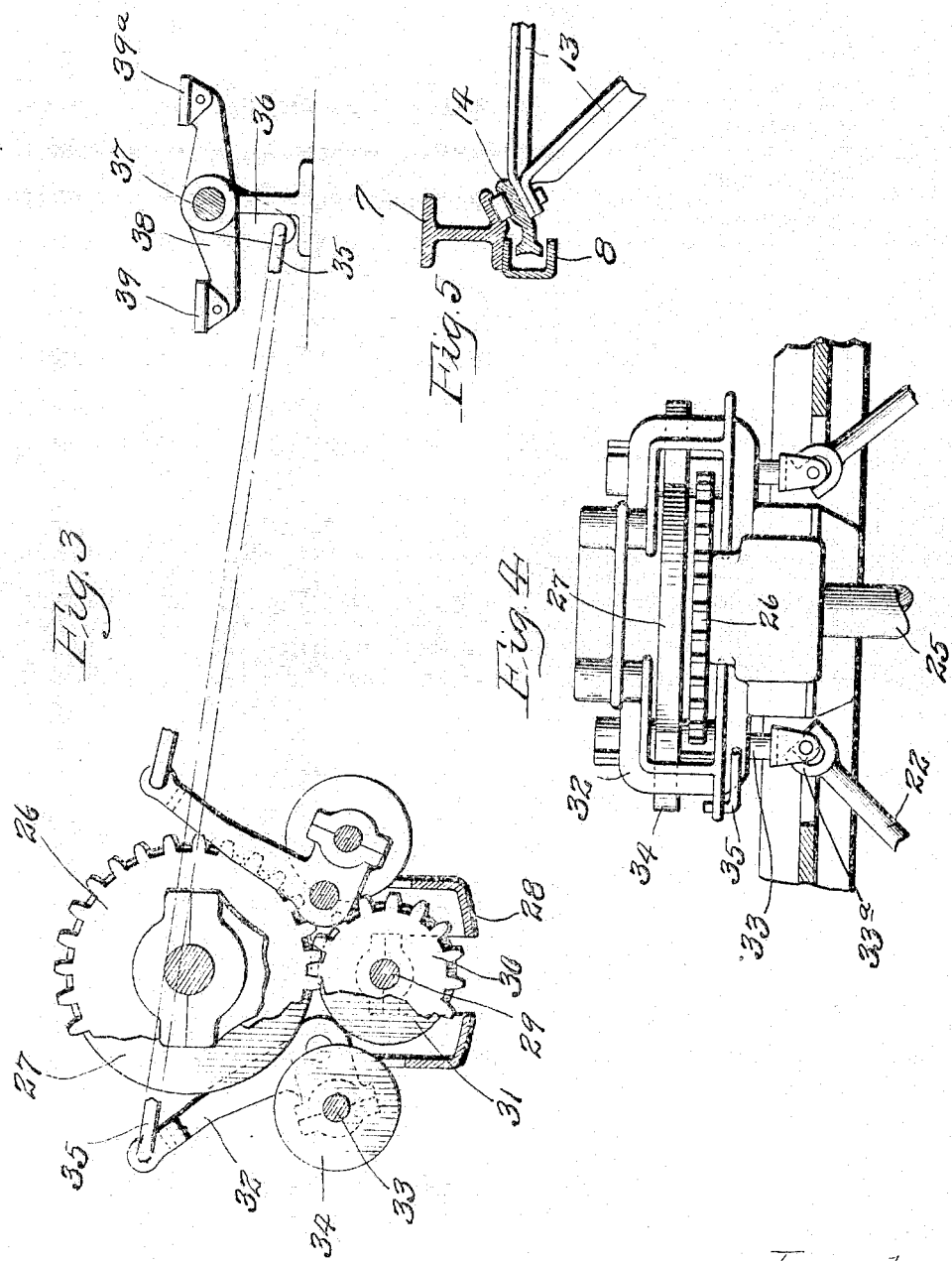

GEORGE B. TIMBERLAKE, OF ST. LOUIS, MISSOURI.

AGRICULTURAL TRACTOR.

1,258,502.  Specification of Letters Patent.  Patented Mar. 5, 1918.

Application filed September 15, 1913. Serial No. 789,939.

*To all whom it may concern:*

Be it known that I, GEORGE B. TIMBERLAKE, a citizen of the United States, residing at St. Louis, Missouri, have invented a certain new and useful Improvement in Agricultural Tractors, of which the following is a full, clear, and exact description, such as will enable others skilled in the art to which it appertains to make and use the same, reference being had to the accompanying drawings, forming part of this specification.

My invention relates to an agricultural tractor of the type utilizing an internal combustion engine as motive power, a pair of comparatively large driving or traction wheels, and a single forward or steering wheel, such tractor being adapted for pulling heavy loads and for operating various agricultural implements, such as plows, cultivators, listers, stalk cutters, disk harrows, and the like.

The principal object of my invention is to provide comparatively simple means whereby the forward or steering wheel of the tractor can be easily and quickly turned in either direction, and further, to provide means whereby the steering mechanism can be actuated either by hand power or by the power of the motor of said tractor.

With the foregoing and other objects in view, my invention consists in certain novel features of construction and arrangement of parts, hereinafter more fully described and claimed, and illustrated in the accompanying drawings, in which—

Figure 1 is a side elevational view of a tractor of my improved construction and showing a series of plows combined therewith;

Fig. 2 is a plan view of the machine with the casing or housing removed and showing my improved steering mechanism in position for use;

Fig. 3 is an enlarged section taken approximately on the line 3—3 of Fig. 2;

Fig. 4 is a plan view of the power operated mechanism seen in Fig. 3;

Fig. 5 is an enlarged detail section taken approximately on the line 5—5 of Fig. 2.

In the construction of my improved tractor, I employ a frame which is preferably formed in a single piece, and comprising side rails 1, a front end rail 2, a rear rail 3, a transverse rail 4, a longitudinally disposed rail 5, which is parallel with the side rails and arranged between the rails 2 and 4 near the left hand side rail 1, and a transverse rail 6 between the central portion of the rail 5 and right hand one of the rails 1.

Formed integral with and extending forwardly from the front ends of the rails 1 are extensions 1ª, with which is formed integral a horizontally disposed ring 7.

Fixed to the underside of this ring is a housing 8 which is channel-shape in cross section and in which a part of the steering mechanism hereinafter described is located.

Formed integral with the front rail 2 and with the rear portion of the ring 7 is a short rail 9 in which a portion of the steering mechanism is mounted for operation. Journaled in suitable bearings on the underside of the frame adjacent to the transverse rail 4, is an axle 10 and mounted on said axle are traction wheels 11. These traction wheels may be of any desired construction, but I prefer to use wheels wherein the hubs, spokes, and rim portions are cast integral.

In some instances, I may find it desirable to use a rim portion which is formed in a single piece and to combine therewith separate spokes and a separate hub as shown in Fig. 1.

The forward steering wheel 12 is mounted in the lower portion of a frame work 13, which latter is fixed to and depends from a solid ring 14 which is positioned within the channel ring 8. The edge of the rear portion of this ring 14 is provided with rack teeth 15 and arranged for rotation in a suitable bearing within the cross piece 9 is a shaft 16 carrying a worm 17 which meshes with said teeth 15.

A short shaft 18 is journaled for rotation in suitable bearings on the main frame of the machine and the forward end of this shaft and shaft 16 are connected by meshing beveled pinions 19. Extending rearwardly from the rear end of shaft 16 and connected thereto by beveled pinions 20 is a shaft 21 which operates in suitable bearings and is provided on its rear end with a steering wheel 21ª.

A shaft 22 is connected to the right hand end of shaft 16 by universal joint 23, and the outer end of this shaft 22 is connected to engine driven means, the same being located on the right hand side of the tractor frame, and preferably in transverse alinement with the motor. This motor 24 is preferably of the internal combustion type and is fixed in any suitable manner to the transverse rails 2 and 6. The motor shaft 25 operates in a suitable bearing on the right hand one of the side rails 1 and fixed on the outer end of said motor shaft is a gear wheel 26 and a friction disk 27. Fixed to the right hand side rail 1 beneath the engine shaft is a bracket 28, the same being provided with suitable bearings in which is journaled a shaft 29, the same carrying a pinion 30 and a friction disk 31. The pinion 30 is in mesh with the gear wheel 26 and the friction disk 31 occupies a position in vertical alinement, and out of contact with, the friction disk 27.

Fulcrumed to bracket 28 is a bell crank 32, the short arm of which carries a shaft 33 and fixed thereon is a friction disk 34, the same being adapted to engage with either one of the friction disks 27 and 31. The inner end of this shaft 33 is connected by a universal joint 33ª to the outer end of the shaft 22.

Pivotally connected to the upper end of the long arm of bell crank 32 is the forward end of a rod 35, the same extending rearwardly over the frame of the machine and the rear end of this rod is pivotally connected to the lower end of a crank arm 36, the latter being carried by a transversely disposed shaft 37. This shaft is mounted in suitable bearings on the frame and fixed to said shaft is a lever 38, the same projecting in both directions from said shaft 37 and the ends of said lever carrying pedals 39 and 39ª.

These pedals and the hand wheel 21ª are positioned adjacent to each other and immediately in front of a driver's seat 40, the latter being suitably supported on the rear portion of the tractor frame.

It will be understood that suitable gearing is utilized for transmitting the motion and power from the engine shaft to the rear axle 10, but as such mechanism forms no part of my invention, the illustration and description thereof are omitted.

To manually operate the steering mechanism to cause the tractor to turn laterally in either direction, the operator positioned on the seat 40 manually engages the hand wheel 21ª and rotates shaft 21 in the proper direction, thereby transmitting the rotary motion of said shaft to shaft 18 through the beveled pinions 20 and from said shaft 18 to shaft 16, through beveled pinions 19. Shaft 16 carries the worm 17 and the latter engaging the teeth 15 of ring 14 turns the latter within its housing 8 and as a result, the frame 13 and the steering wheel 12 carried thereby will be turned in the proper direction and consequently the tractor will be guided or turned laterally simultaneously with its forward movement.

In the event that it is not feasible to steer the tractor by the manually operated mechanism just described, or when the steering wheel is in a rut or depression, then the power driven steering gear is utilized.

The operator throws the power driven steering gear into operation by pressing down on either one of the pedals 39 or 39ª, depending, of course, upon the direction in which it is desired to turn. Such operation actuates bell crank 32 to move friction disk 34 into engagement with either friction disk 27 or friction disk 31, with the result that shaft 33 is rotated and such rotary motion is transmitted to shaft 22 and from thence to shaft 16 carrying the worm 17, the latter meshing with the teeth of ring 14. The teeth 15 extend around ring 14 for a distance of over half its circumference. Consequently it is possible to turn the steering wheel 12 into position substantially at right angles to the planes occupied by the traction wheels 11, with the result that the tractor can be turned completely around within a distance approximately twice its length.

Steering mechanism of my improved construction is comparatively simple, can be easily operated and controlled, and is very efficient in use.

It will be readily understood that minor changes in the size, form and construction of the various parts of my improved tractor can be made and substituted for those herein shown and described, without departing from the spirit of my invention, the scope of which is set forth in the appended claims.

I claim:

1. In an agricultural tractor, a frame, a pair of traction wheels, a single steering wheel positioned beneath the front end of said frame, a frame in which the steering wheel is carried, a ring on said frame, a circular housing on the tractor frame in which said ring is mounted, teeth formed on said ring, a worm shaft journaled in the tractor frame, a worm on said shaft, which meshes with the teeth on the ring, manually operated means for imparting movement to the worm shaft, an engine on the tractor frame, and manually controlled means operated by the engine and connected to the worm shaft for operating the same.

2. In an agricultural tractor, a frame having a horizontally disposed circular housing at its forward end, traction wheels on which the frame is mounted, a ring loosely mounted in the circular housing, which ring is provided with a series of teeth, a frame fixed to and depending from the ring, a steering wheel journaled in said last mentioned frame, which steering wheel is located at the longitudinal center line of the frame, a worm journaled in the tractor frame, and engaging with the teeth of the ring, and manually operated means for imparting movement to the worm shaft.

3. In an agricultural tractor, a frame having horizontally disposed circular housing at its forward end, traction wheels on which the frame is mounted, a ring loosely mounted in the circular housing, which ring is provided with a series of teeth, a frame fixed to and depending from the ring, a steering wheel journaled in said last mentioned frame and located at the longitudinal center line of the frame, a worm journaled in the tractor frame, and engaging with the teeth of the ring, manually operated means for imparting movement to the worm shaft, an engine on the tractor frame, and manually controlled means operated by the engine and connected to the worm shaft for operating the same.

4. In an agricultural tractor, a frame having a horizontally disposed annular housing at its forward end, a ring supported on roller bearings within said housing, teeth formed on said ring, a worm shaft journaled on the tractor frame, a worm on said shaft, which meshes with the teeth on the ring, a frame fixed to and depending from the ring, a single steering wheel journaled in said last mentioned frame, which steering wheel is located at the longitudinal center line of the frame, and means for imparting movement to the worm shaft.

5. In an agricultural tractor, a frame, traction wheels therefor, a horizontally disposed circular housing at the forward end of the frame, a ring loosely mounted in said circular housing, a frame fixed to and depending from said ring, a steering wheel journaled in said last mentioned frame, which steering wheel is centrally disposed with respect to the tractor frame and the traction wheels, an engine carried by the tractor frame, and manually controlled means operated by said engine, for actuating said ring.

In testimony whereof I hereunto affix my signature in the presence of two witnesses, this 14th day of August, 1913.

GEORGE B. TIMBERLAKE.

Witnesses:
M. P. SMITH,
M. A. HANDEL.

Copies of this patent may be obtained for five cents each, by addressing the "Commissioner of Patents, Washington, D. C."